(12) United States Patent
Fabbri et al.

(10) Patent No.: US 8,807,803 B2
(45) Date of Patent: Aug. 19, 2014

(54) LED LIGHTING DEVICE OF AN AIRCRAFT, IN PARTICULAR FOR MANEUVERS OF LANDING, TAKE-OFF, TAXIING, AND SEARCHING, AND AIRCRAFT COMPRISING SAID DEVICE

(75) Inventors: Francesco Fabbri, Montevarchi (IT); Paolo Vanni, Pontassieve (IT); David La Paola, Pergine Valdarno (IT)

(73) Assignee: Sirio Panel S.p.A., Montevarchi (IT)

( * ) Notice: Subject to any disclaimer, the term of this patent is extended or adjusted under 35 U.S.C. 154(b) by 162 days.

(21) Appl. No.: 13/290,965

(22) Filed: Nov. 7, 2011

(65) Prior Publication Data

US 2012/0140498 A1    Jun. 7, 2012

(30) Foreign Application Priority Data

Nov. 5, 2010    (IT) .............................. TO2010A0886

(51) Int. Cl.
*F21V 7/00*    (2006.01)
(52) U.S. Cl.
USPC . 362/341; 362/217.05; 362/294; 362/296.01; 362/345; 362/347; 362/470
(58) Field of Classification Search
USPC ............. 362/217.02, 217.05–217.07, 296.01, 362/296.08, 296.1, 310, 341, 347, 350, 470, 362/516, 518, 294, 345
See application file for complete search history.

(56) References Cited

U.S. PATENT DOCUMENTS

| | | | |
|---|---|---|---|
| 5,136,483 A * | 8/1992 | Schoniger et al. ............ | 362/545 |
| 6,945,672 B2 | 9/2005 | Du et al. | |
| 7,422,347 B2 * | 9/2008 | Miyairi et al. ................ | 362/335 |
| 7,513,642 B2 | 4/2009 | Sormani | |
| 7,762,700 B2 * | 7/2010 | Luo et al. ...................... | 362/545 |
| 2005/0094401 A1 | 5/2005 | Magarill | |
| 2006/0007013 A1 | 1/2006 | Singer et al. | |
| 2009/0290356 A1 | 11/2009 | Chen | |
| 2010/0238658 A1 | 9/2010 | Xiang et al. | |

FOREIGN PATENT DOCUMENTS

| | | |
|---|---|---|
| EP | 1077344 A2 | 2/2001 |
| EP | 1731423 A1 | 12/2006 |
| EP | 1596125 B1 | 1/2008 |
| EP | 2131104 A2 | 12/2009 |
| WO | 2007040527 A1 | 4/2007 |

OTHER PUBLICATIONS

Extended European Search Report for EP Application No. 11188140.5, dated Mar. 1, 2012, 7 pages.

* cited by examiner

*Primary Examiner* — Meghan Dunwiddie
(74) *Attorney, Agent, or Firm* — Seed IP Law Group PLLC

(57) ABSTRACT

AN LED lighting device of an aircraft for maneuvers of landing, and/or take-off, and/or taxiing, and/or searching comprising: one or more light-emitting modules including a light-emitting semiconductor device configured for emitting a light radiation; a supporting substrate carrying the light-emitting semiconductor device; a curved reflector having a concave reflecting surface and defining a plane of emission, wherein the concave reflecting surface has a semiparabolic shape obtained by sectioning a semiparaboloid along two mutually parallel cutting planes, and is arranged facing the light-emitting semiconductor device in such a way as to collect the light radiation and generate a radiation reflected through the plane of emission.

23 Claims, 14 Drawing Sheets

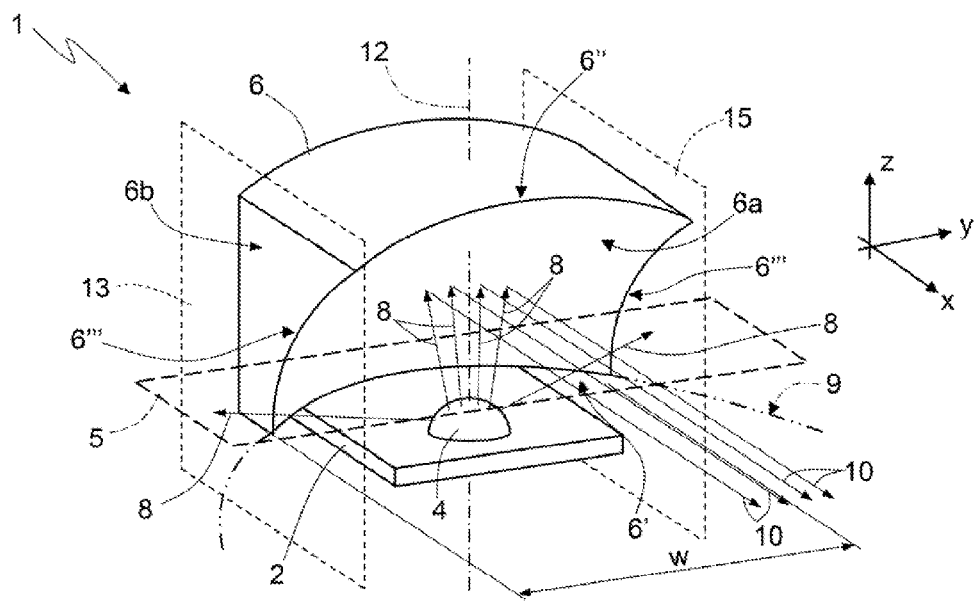
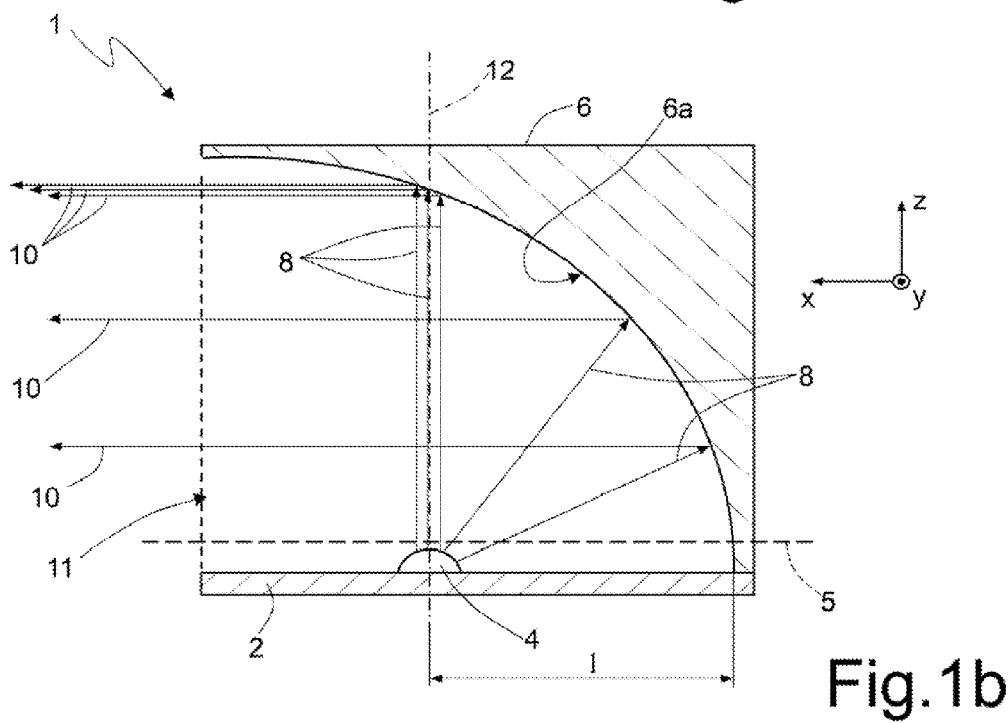
Fig.1a
Fig.1b

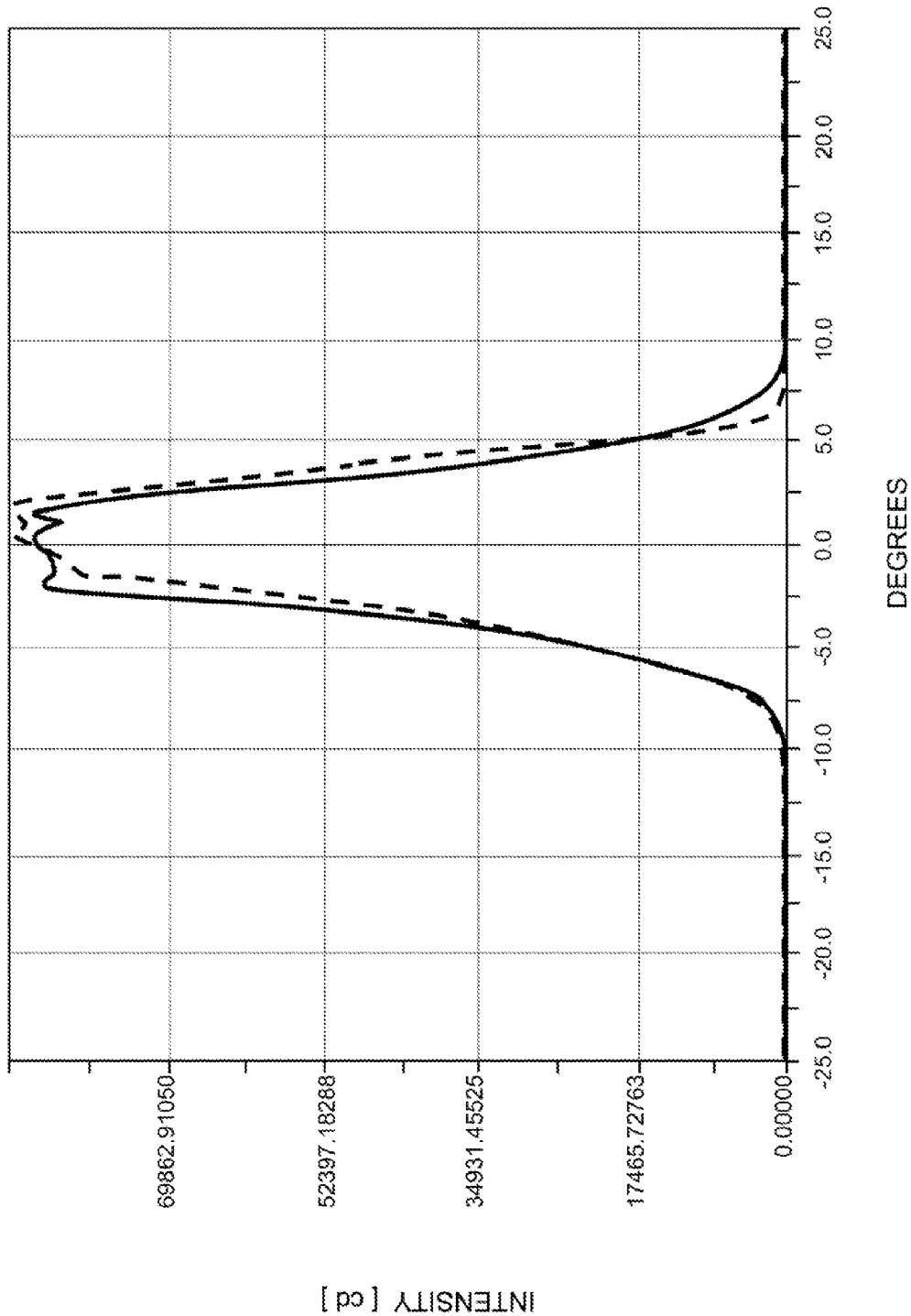

|  | Fig.3a | Fig.3b | Fig.3c | Fig.3d |
|---|---|---|---|---|
| d (mm) | 70 | 100 | 70 | 100 |
| w (mm) | 40 | 40 | 70 | 100 |
| efficiency (%) | 63 | 71 | 72 | 87 |
| peak int. (cd) | 62212.39 | 89602.95 | 77752.97 | 136142.1 |
| FWHM (degrees) | 6 | 6 | 6 | 5 |

Fig.4

|  | Fig.3a | Fig.3b | Fig.3c | Fig.3d |
|---|---|---|---|---|
| d (mm) | 70 | 100 | 70 | 100 |
| w (mm) | 40 | 40 | 70 | 100 |
| efficiency (%) | 77 | 94 | 78 | 97 |
| peak int. (cd) | 46620.25 | 82733.33 | 48141.72 | 91833.84 |
| FWHM (degrees) | 8 | 7 | 8 | 7 |

Fig.5

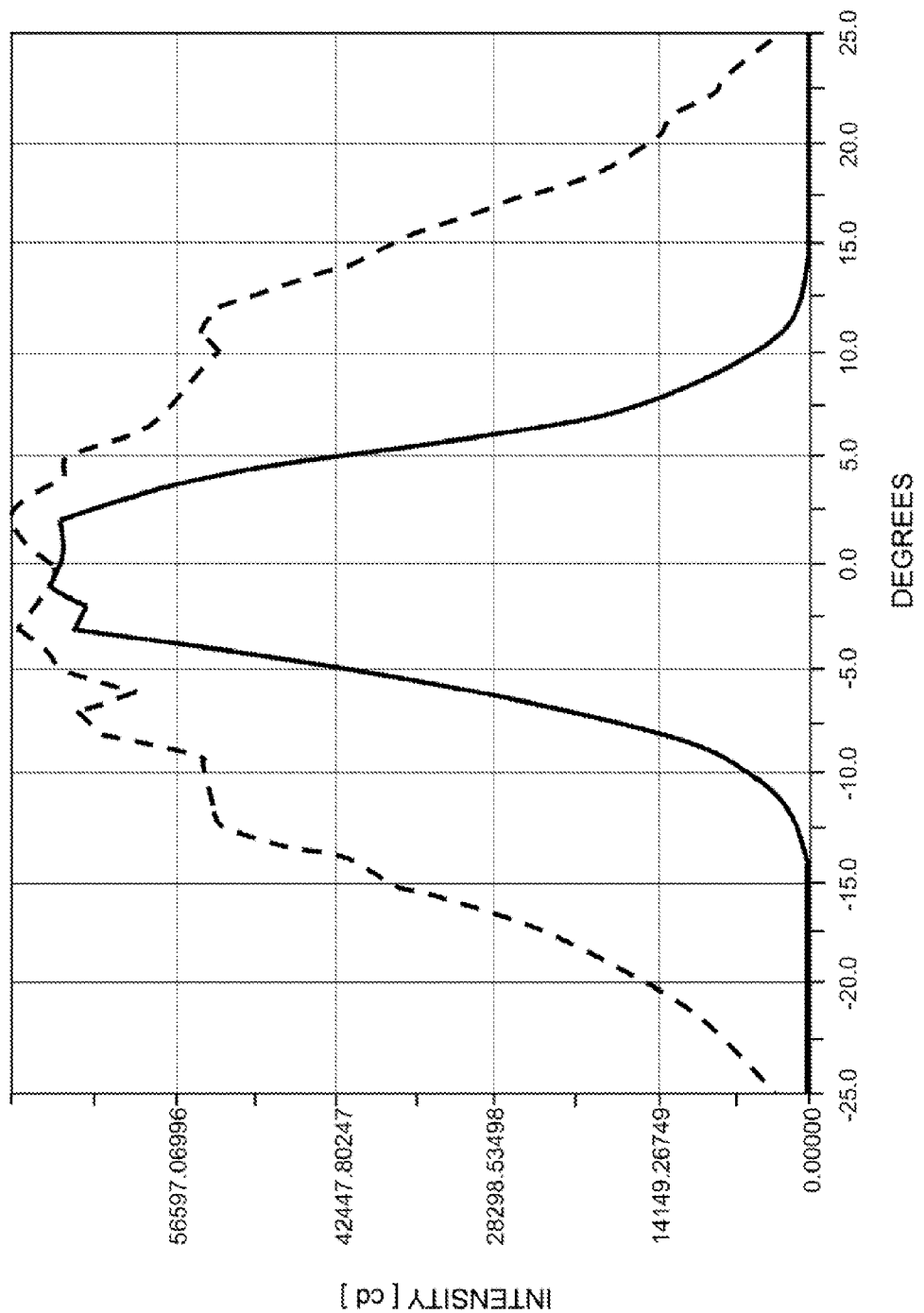

LED LIGHTING DEVICE OF AN AIRCRAFT, IN PARTICULAR FOR MANEUVERS OF LANDING, TAKE-OFF, TAXIING, AND SEARCHING, AND AIRCRAFT COMPRISING SAID DEVICE

BACKGROUND

1. Technical Field

The present invention relates to an LED lighting device for an aircraft, in particular for maneuvers of landing, and/or take-off, and/or taxiing, and/or searching, to a lighting system comprising a plurality of lighting devices, and to an aircraft comprising said lighting system.

2. Description of the Related Art

As is known, aircraft (for example, airplanes, helicopters, etc.) enabled for night-time operations are obliged to mount a plurality of lighting systems, necessary during operations of take-off and landing (landing lights), taxiing on the runway (taxi lights), and searching (search lights). Said lights can moreover have signaling functions for other aircraft, for the control tower, etc.

Lighting systems used for landing operations are of crucial importance in so far as they perform the function of illuminating the runway during take-off and landing so that the pilots can visually assess the conditions of the runway. Furthermore, in some cases, the same lights can be used by control-tower operators (and possibly by pilots of other aircraft) for visual identification of the presence and/or direction of flight of the aircraft provided with said lighting systems.

Taxi lights are, instead, used when the aircraft is moving around on the ground and have the function of improving visibility for the pilots, above all in airports that are poorly illuminated. Taxi lights are in any case kept on, together with the landing lights, during the operations of take-off and landing to improve further visibility of the runway.

The lighting systems for landing, taxiing, and searching must be configured so as to provide a long-distance lighting (hundreds of meters), and consequently must generate a light beam of a very high intensity. Avionics standards, such as, for example, MIL-L-006730, MIL-L-6503, and SAE ARP 693, require, for landing lighting systems, a value of peak light intensity higher than approximately 300,000 cd, with a beam spread (defined as the angle for which the light intensity decreases to 10% with respect to the peak intensity) of approximately 10°. The aforementioned avionics standards require a peak light intensity for taxi lights higher than approximately 50,000 cd, with a beam spread of approximately 40° in the horizontal plane and 10° in the vertical plane.

To meet the performance requirements, lighting systems of a known type comprise a single incandescent lamp, halogen lamp, or high-intensity discharge (HID) lamp set along the central axis of a cylindrical or hemispherical, or generally parabolic, reflector. Said configuration is rendered necessary by the fact that incandescent, halogen, and HID light sources emit a light beam with a solid angle of approximately 4°; for this reason, the reflector generally has the shape of a paraboloid of revolution, and, consequently, the lighting system as a whole assumes a cylindrical shape with a diameter greater than 10 cm.

Lights that comprise incandescent lamps, halogen lamps, and HID lamps present the disadvantage of having a poor reliability (they last only a few thousand hours), moreover reduced by the marked environmental stresses to which they are subjected during their service life. Consequently, for safety reasons, many aircraft mount a plurality of reserve lighting systems, which cause an increase in weight of the aircraft itself, as well as an increase in the costs of production and maintenance. In addition to the poor reliability, also the consumption of incandescent or halogen lamps is not negligible (several hundred watts).

Given that the ideal position of said lights is typically under the nose of the aircraft, their shape and dimension create friction with the air in flight. For this reason, the lights are frequently equipped with a mechanical system for sending out the lights, which increases the cost of the light as well as the maintenance costs.

It should be borne in mind that the lighting performance required by avionics standards must be guaranteed in all the real conditions in which the aircraft might find itself, hence even at temperatures exceeding 50° C. Furthermore, the performance envisaged by the aforementioned standards is required also when the lighting device is at the end of its service life, after a certain number of operating hours. For these reasons lighting devices for aircraft, at the start of their service life and in conditions of standard operation (typically, at approximately 25° C.), frequently have to be designed to guarantee a lighting intensity that is considerably higher than the theoretical lighting intensity required. A high lighting intensity is a cause of high generation of heat by the light sources themselves, of whatever type they may be. Said heat, if not appropriately dissipated, causes a shortening of the service life of said light sources, or failure thereof. Appropriate heat dissipaters must be consequently provided, at the cost of an increase in the overall dimensions required by the lighting systems and in weight. This is a further problem of lighting systems of a known type.

BRIEF SUMMARY

The aim of the present invention is to provide a lighting device of an aircraft for maneuvers of landing, take-off, taxiing, and searching, a lighting system comprising a plurality of lighting devices, and an aircraft comprising the lighting system, that will be able to overcome the drawbacks of the known art. In particular, the lighting device and system according to the present invention are able to minimize simultaneously the levels of energy consumption, the failure rate, the space occupied and the weight, and at the same time satisfy the requirements of light intensity and beam spread specified in the avionics standards MIL-L-006730, MIL-L-6503, and SAE ARP 693.

According to the present invention, an LED lighting device for an aircraft, a lighting system comprising a plurality of lighting devices, and an aircraft comprising said lighting system are provided as defined in the annexed claims.

BRIEF DESCRIPTION OF THE SEVERAL VIEWS OF THE DRAWINGS

For a better understanding of the present invention, preferred embodiments are now described, purely by way of non-limiting example, with reference to the attached drawings, wherein:

FIG. 1a shows a perspective view of a lighting device according to one embodiment of the present invention;

FIG. 1b shows, in lateral cross-sectional view, the lighting device of FIG. 1a;

FIG. 2 illustrates performance of the lighting device of FIG. 1a and FIG. 1b in terms of angular light intensity in the planes XY (solid curve) and XZ (dashed curve);

FIG. 4 shows a table, appearing in which, by way of comparison, are the values of peak intensity, spread of the light beam emitted, and efficiency for each of the embodiments of FIGS. 3a-3d and with LEDs having Lambertian emission;

FIG. 5 shows a table, appearing in which are, by way of comparison, the values of peak intensity, spread of the light beam emitted, and efficiency for each of the embodiments of FIGS. 3a-3d and with LEDs having non-Lambertian emission and with hemispherical cap;

FIG. 12 shows curves of angular intensity in the planes XY and XZ obtained by optical simulations of the system of FIG. 11;

DETAILED DESCRIPTION

Figure 3A:
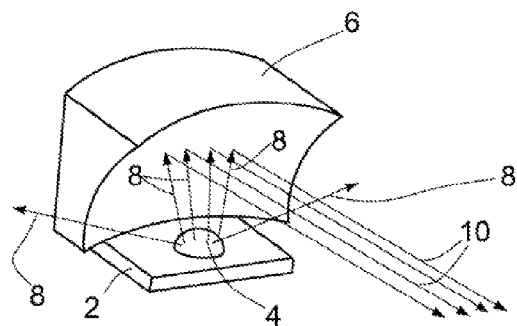
FIGS. 3a-3d show in perspective view, by way of comparison, respective lighting devices provided with parabolic or semiparabolic reflectors having dimensions of aperture, chord, and curvature that are different from one another.

FIGS. 1a and 1b show a lighting device according to one non-limiting embodiment of the present invention. The lighting device of FIGS. 1a and 1b uses an LED (light-emitting diode) light source. The applicant has found that LED sources are particularly advantageous for use in landing lights, taxi lights, or search lights for aircraft in so far as they enable a considerable reduction of energy consumption (approximately one third as compared to incandescent or halogen lamps) and possess a low failure rate (tens of times lower than that of incandescent or halogen lamps). Furthermore, LED sources emit a light beam with a solid angle smaller than 2°, whereas other light sources (incandescent, or halogen, or HID lamps) emit a light beam with a solid angle of approximately 4°. It is hence possible to provide reflectors and lamps having non-cylindrical shapes, thus optimizing the volume occupied and reducing the aerodynamic impact. Thus, it is not necessary for the lighting system to be retractile for the sole purpose of reducing the aerodynamic impact. To reduce the production costs, said lights can be kept in a fixed or semi-fixed position outside the aircraft itself, with reduced aerodynamic impact. Also the weights are reduced, in so far as there is no need for a motor adapted to move the lighting system.

In the document No. U.S. Pat. No. 6,945,672 a lighting system is proposed comprising an LED resting on a planar reflecting surface, wherein, set around said source is a curved reflector having a semiparabolic concave shape. The invention regards a low-profile headlight for motor vehicles. Similar lighting systems are proposed in the documents Nos. U.S. Pat. No. 7,513,642 and EP 1 596 125, which describe a headlight for motor vehicles and differ from the previous document No. U.S. Pat. No. 6,945,672 in that they propose a more elaborate system for collimating light.

Said lamps are explicitly designed for being used as headlights for motor vehicles or, in general, for vehicles for road use. Headlights of this type must guarantee a light emission having intensity of approximately 30,000 cd along the axis of emission of the light beam. In any case, the light intensity generated must be such as not to bother other drivers and not to create a danger. For this purpose, it is necessary to use LED sources that are able to provide a luminous flux of some hundreds of lumen.

Lamps or lighting systems for avionics use must, instead, guarantee a minimum intensity of the light emitted (and hence a luminous flux generated by the LED source) of approximately one order of magnitude higher (light intensity higher than 300,000 cd). Frequently, said performance must be guaranteed also in conditions of high ambient temperature (e.g., 50° C. or higher), from start of the life cycle of the lighting device as far as the end of the life cycle envisaged for the lighting device. Since the intense use of any lighting device causes a degradation of the performance thereof over time (the light intensity emitted decreases with use), to guarantee the performance required also at the end of life, it is evident that at the start of their service life the peak intensity will have to be considerably greater than 300,000 cd. This means that, if a lamp of a known type used for aircraft were to be adapted for use in motor vehicles, it would be necessary to increase at least of one order of magnitude the size of said lamps and consequently their weight. It is evident that said solution is impracticable and non-competitive.

To turn now to FIGS. 1a and 1b, these illustrate, respectively in perspective view and side view, a lighting device 1 comprising: a supporting board 2, for example a printed circuit board (PCB), arranged parallel to a horizontal plane XY; an LED 4, arranged on the supporting board 2; and a reflector 6, which is provided with an internal reflecting surface 6a, facing the LED 4, having a concave shape.

The LED 4 emits a light radiation 8, represented schematically in the figure with a plurality of arrows, which impinges on a plane of irradiation 5, parallel to the horizontal plane XY, with a solid angle defined by the angle of emission of the LED 4. The reflector 6 is shaped like a "slice" of semiparaboloid and is arranged facing the LED 4 and in such a way as to receive the light radiation 8 via its internal surface 6a and reflect the light radiation 8 in a direction substantially parallel to the horizontal plane XY, generating a reflected light radiation 10. The reflected light radiation 10 is then supplied at output by the lighting device 1 in a collimated way, substantially perpendicular to a plane of emission 11 orthogonal to the horizontal plane XY. In greater detail, the internal surface 6a of the reflector 6 has a semiparabolic shape obtained by sectioning a semiparaboloid along a first cutting plane 13 and a second cutting plane 15, which are mutually parallel and perpendicular to the horizontal plane XY. The first and second cutting planes 13, 15 are moreover parallel to an axis 12 passing through the LED 4. The axis 12 is the axis along which there is the maximum intensity of flux emitted by the LED 4. The internal surface 6a comprises a curved base portion 6' lying substantially in the horizontal plane XY lying in which is the supporting board 2, a curved top edge portion 6" at a distance from the base portion 6', and two curved side portions 6''' connecting the ends of the base portion 6' with the respective ends of the top edge portion 6".

The base portion 6', of a curved type, lies on a parabola 9 (represented with a dashed line) having aperture d and curvature c. The ends of the base portion 6' delimit a chord w of the parabola 9. The chord w defines the width of the internal surface 6a of the reflector 6 of the lighting device 1.

The reflector 6 is moreover delimited on its external sides by lateral regions 6b (only one lateral region 6b is visible in FIG. 1) in such a way that the total width w of the internal surface 6a is smaller than the diameter d.

The reflector 6 is configured in such a way as to receive only a portion of the total light radiation emitted by the LED 4 and in particular the light radiation 8 having maximum intensity. Said light radiation 8 is the one emitted in a direction substantially perpendicular to the horizontal plane XY lying in which is the supporting board 2 (direction defined by the axis 12 passing through the LED 4) and, according to the embodiment of FIGS. 1a and 1b, orthogonal to the horizontal plane XY. The geometrical variables of the lighting device 1 are hence the chord w, the aperture d, and the curvature c. The variables w and d assume, preferably and according to the need, values comprised between a few millimeters and some tens of millimeters; the variable c, instead, preferably assumes values comprised between $0.01$ mm$^{-1}$ and $0.1$ mm$^{-1}$.

These values, however, represent intervals and an overall geometry that the applicant has identified as particularly suitable for a base lighting device, which uses a single LED light source. If need be, a plurality of lighting devices can be coupled to one another (for example, arranging them alongside one another or providing them as a single block) for obtaining landing lights, taxi lights, and search lights for aircraft, thus minimizing the volume and weight.

If the specific application so requires, the variables w, d, and c can assume values lower or higher than the intervals indicated above. In one embodiment of the lighting device 1, said variables assume the following values: w=40 mm, d=100 mm, and c=0.04 mm$^{-1}$. In this embodiment of the lighting device 1, the values of chord w and aperture d are chosen in such a way as to be able to combine together a plurality of lighting devices of the type illustrated in FIG. 1 arranging them alongside one another (laterally, or vertically aligned along the axis Z, for example in such a way said that the respective supporting boards 2 face one another), and obtain a modular lighting system that can in any case be housed in a cylindrical space having a base diameter of 10 cm (see, for example, FIGS. 9 and 11). These dimensions moreover enable a landing light to be obtained that satisfies the SAE ARP 693C requirements using four modules (four light sources) that can be contained in a cylindrical space with a diameter of 10 cm, i.e., similar, in terms of space occupied, to landing lights of a known type. The modular lighting system thus obtained can be mounted on pre-existing aircraft instead of landing lights, taxi lights, or search lights of a known type (which generally, as has been said, have a cylindrical shape with a diameter of 10 cm) without the need to make structural modifications to the aircraft.

Given that the LED 4 is the only light source of the light-emitting device 1, it must emit a luminous flux of some thousands of lumen in order for the light-emitting device 1 to be compliant with the avionics standards. Available on the market are LED sources configured for supplying a luminous flux of at least 1000 lumen. Said characteristic depends upon the size of the LED chip, which, for high-power LED sources, ranges from 1×1 mm$^2$ to 3×3 mm$^2$. The emission of an LED source can be considered, to a first approximation, of a Lambertian type on approximately one half of the solid angle. However, LED sources commonly available on the market are usually protected by means of a transparent cap of a hemispherical shape. Said cap models the light radiation emitted by the LED source limiting its emission around a solid angle having a planar section of approximately 120°. The light radiation hence loses the Lambertian characteristic. The optimization process described hereinafter has been implemented via optical simulations considering chip sizes that range from 1×1 mm$^2$ to 3×3 mm$^2$ and emission of the LED of a Lambertian type or else modified by the presence of a hemispherical glass cap. Analyzing these extreme cases, we can consider the results as representative of the majority of high-power LEDs available on the market. In the optical simulations, the LED 4 emits a luminous flux of 1700 lm. This value is of course provided by way of example, but is representative of a high-power LED having a consumption of 20-25 W.

FIG. 2 shows the performance of the lighting device of FIGS. 1a and 1b in terms of angular light intensity in the planes XY (solid curve) and XZ (dashed curve). The performance illustrated in FIG. 5 indicates a peak intensity higher than 80,000 cd and beam spread greater than 14° (plane XY) and 10° (plane XZ). Said performance has been obtained via optical simulations, considering an LED having a chip size of 3×3 mm$^2$, hemispherical cap, and luminous flux of 1700 lumen. These results have been confirmed by measurements carried out on a prototype of the lighting device having the aforementioned characteristics.

Figure 3B:
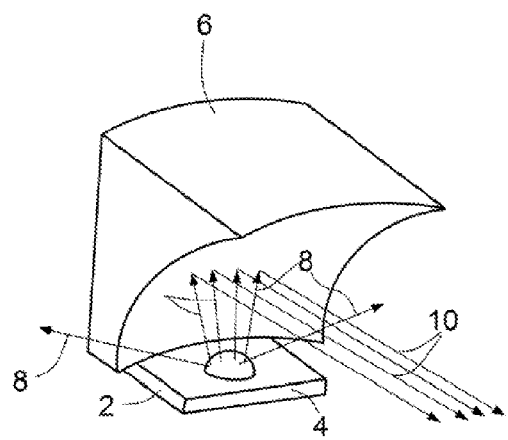
Figure 3C:
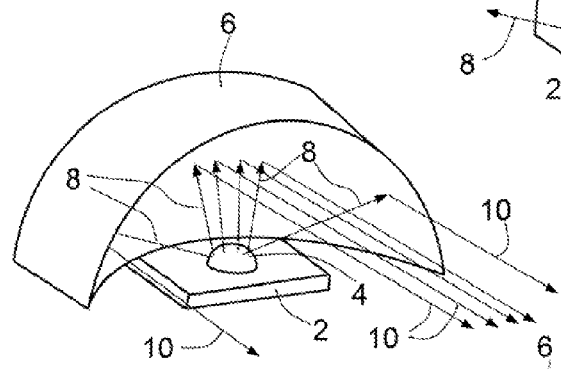
Figure 3D:
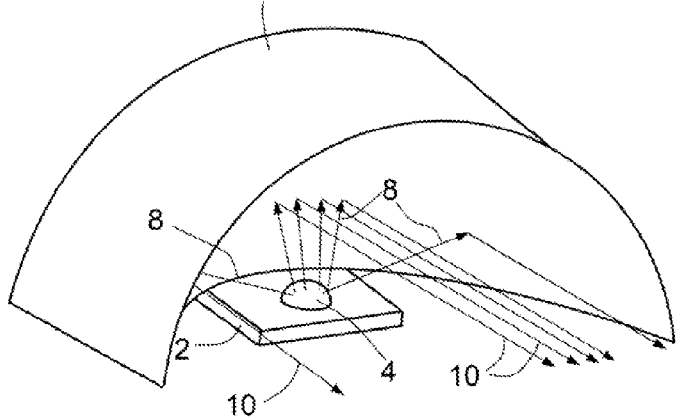

FIGS. 3a-3d show respective embodiments of lighting modules for different values of aperture d and chord w. The values of aperture d and chord w in the four situations of FIGS. 3a-3d are given in the tables illustrated in FIG. 4 (Lambertian-emission diode) and 5 (non-Lambertian-emission diode); namely: FIG. 3a shows a lighting device having aperture d=70 mm and chord w=40 mm; FIG. 3b shows a lighting device having aperture d=100 mm and chord w=40 mm; FIG. 3c shows a lighting device having aperture d=70 mm and chord w=70 mm; and FIG. 3d shows a lighting device having aperture d=100 mm and chord w=100 mm.

The comparison between the four embodiments of FIGS. 3a-3d illustrated in the tables of FIG. 4 and FIG. 5 has been made in terms of peak intensity (cd), spread (degrees) of the light beam (half angle for which the intensity is 10% the peak intensity), and efficiency (percentage of the lumens used within the useful angle). The results for the four situations are given in the table of FIG. 4 in the case of an LED 4 having Lambertian emission and in the table of FIG. 5 in the case of an LED 4 having a transparent hemispherical cap and hence a non-Lambertian emission. It should be noted that the embodiment of FIG. 3b corresponds to the preferred embodiment already described previously with reference to FIGS. 1a and 1b, and is here given to provide a more convenient comparison with the other embodiments.

Using an LED 4 with Lambertian emission, the applicant has found that, in the situation of FIG. 3b, a value of efficiency of 71%, a value of peak intensity of 89,600 cd and a value of beam width of 6° are obtained. Using, instead, an LED 4 provided with the transparent hemispherical cap, the applicant has found that, once again in the situation of FIG. 3b, a value of efficiency of 93%, a value of peak intensity of approximately 82,733 cd, and a value of beam width of 7° are obtained. The values of the data appearing in the tables of FIGS. 4 and 5 show that the lighting device of FIG. 3b is a particularly advantageous compromise if compared with the values of efficiency, peak intensity, and beam width obtained for the embodiments of FIGS. 3a, 3c, and 3d, in so far as the embodiment of FIG. 3b presents at the same time a reduced encumbrance/weight and a good level of optical performance. Particularly in the case of an LED 4 with hemispherical cap, i.e., the most common case among LEDs present on the market, the solution of FIG. 3b presents a peak intensity and efficiency only slightly lower than the situation of FIG. 3d, but an encumbrance/weight of approximately one third. An important role is played by the aperture d of the reflector 6, which would have to be maximized, compatibly with the spaces available.

In the ensuing analysis, the solution of FIG. 3b is considered (d=100 mm, w=40 mm) as the value of curvature c varies.

Figure 6A:
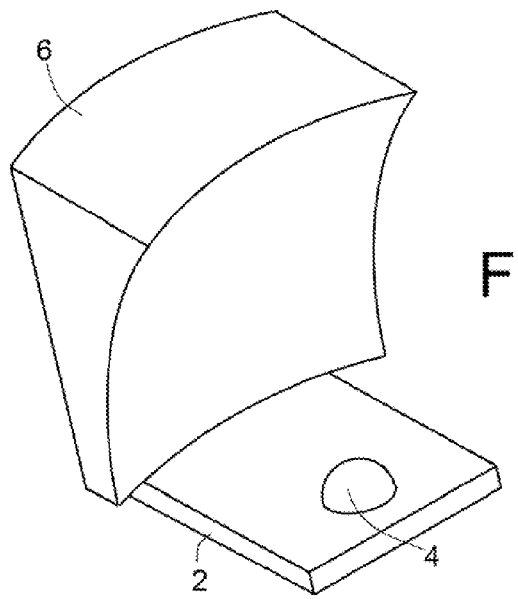
FIGS. 6a-6c show, in perspective view, by way of comparison, respective lighting devices having different confocal reflectors.
Figure 6B:
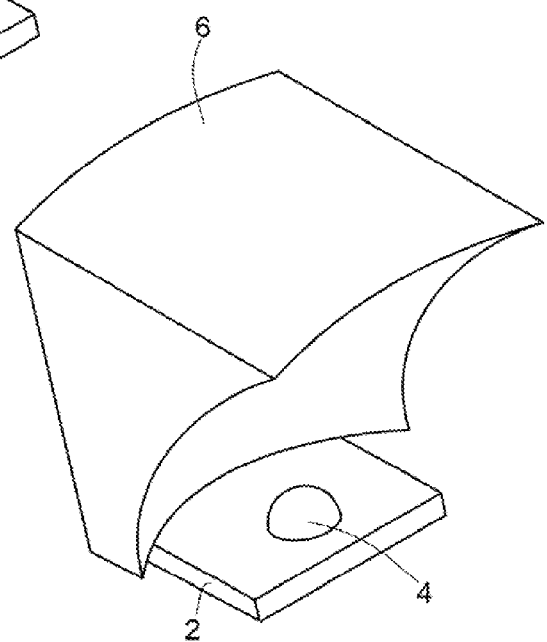
Figure 6C:
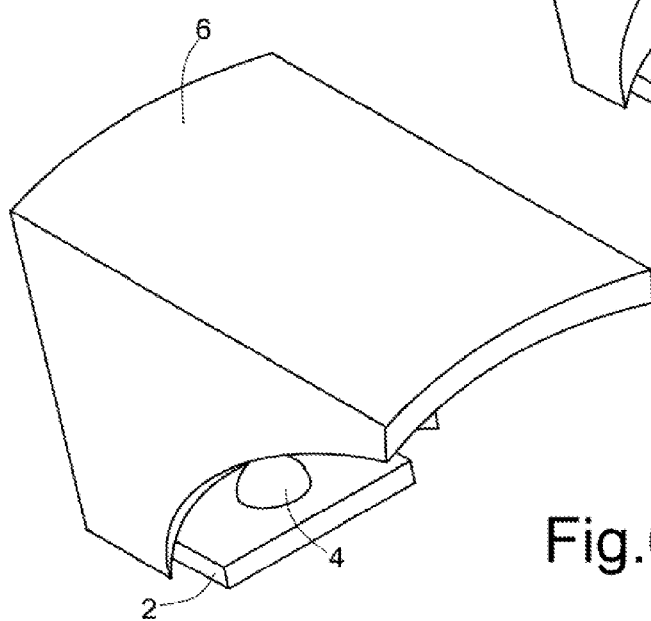

The LED 4 is fixed in the focal position of the reflector 6, and geometries corresponding to curvatures c in the range comprised between 0.06 mm$^{-1}$ and 0.02 mm$^{-1}$, i.e., the cases of practical interest, are compared. FIGS. 6a-6c show respective lighting modules with different values of curvature, in particular curvature c=0.06 mm$^{-1}$ (first limit case, FIG. 6a), curvature c=0.04 mm$^{-1}$ (intermediate case, FIG. 6b), and curvature c=0.02 mm$^{-1}$ (second limit case, FIG. 6c).

With optical simulations, the applicant has observed the evolution of the peak intensity as a function of the curvature c of the reflector 6 for the embodiments of FIGS. 6a-6c. Said evolution has been observed in the case of an LED 4 with Lambertian emission (FIGS. 7a-7c) and with hemispherical cap (FIGS. 8a-8c).

Figure 7A:
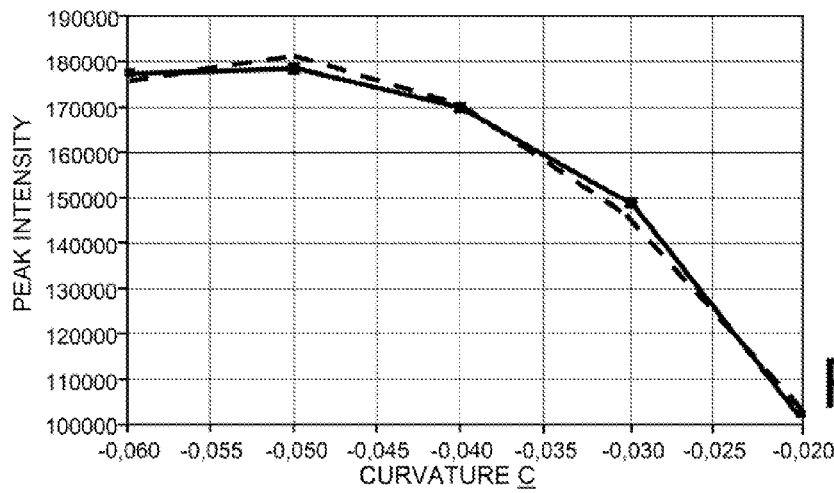
FIGS. 7a-7c show curves of variation of light intensity of the lighting devices, respectively, of FIGS. 6a-6c, for LEDs having Lambertian emission and for respective dimensions of the LED chip.
Figure 7B:
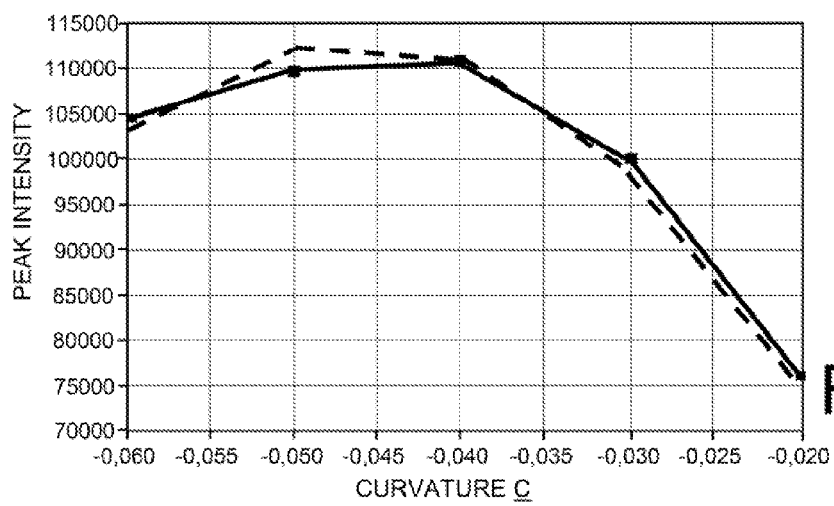
Figure 7C:
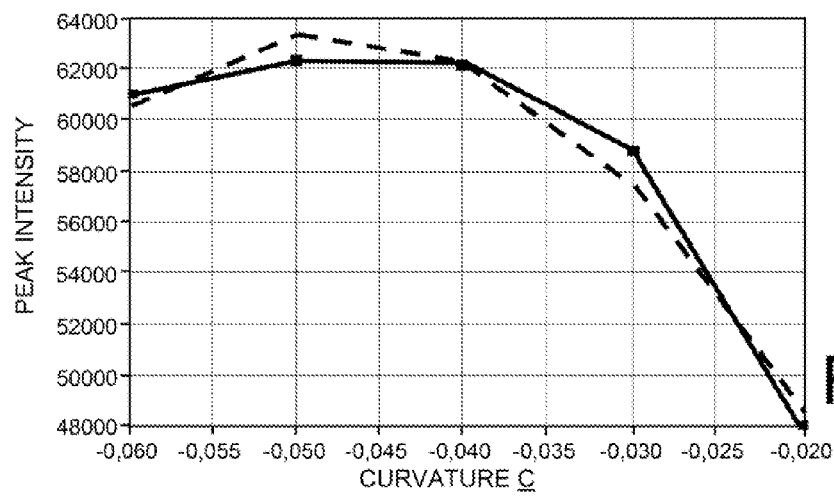
Figure 8A:
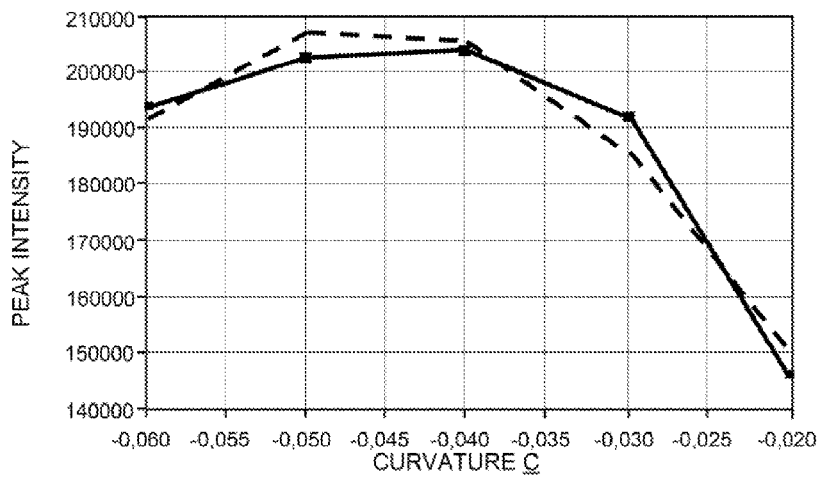
FIGS. 8a-8c show curves of variation of light intensity of the lighting devices, respectively, of FIGS. 6a-6c, for LEDs having non-Lambertian emission and with hemispherical cap, for respective dimensions of the LED chip.
Figure 8B:
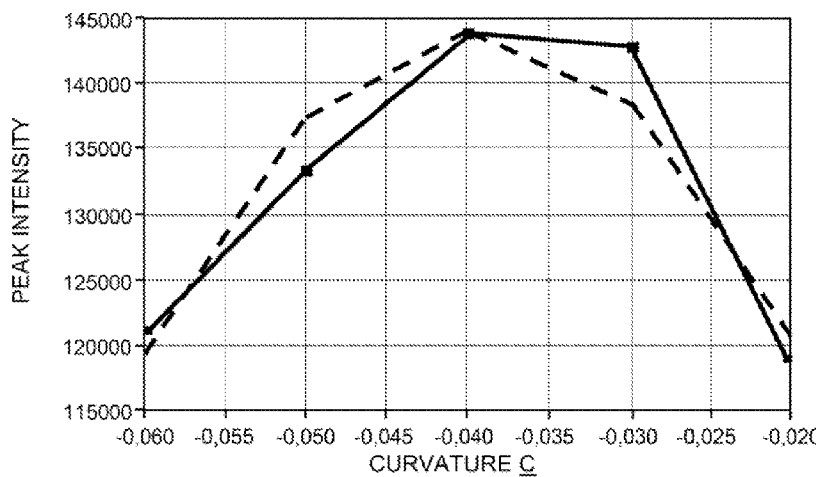
Figure 8C:
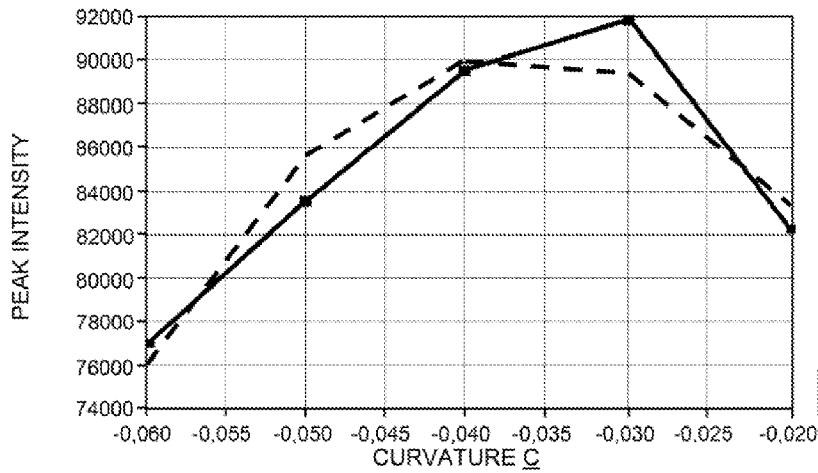

The graphs of FIGS. 7a and 8a regard a size of the LED chip of 1×1 mm$^2$; the graphs of FIGS. 7b and 8b regard a size of the LED chip of 2×2 mm$^2$; and the graphs of FIGS. 7c and 8c regard a size of the LED chip of 3×3 mm$^2$. The values of size of the LED chip chosen are representative of the majority of high-power LEDs available on the market.

From the graphs of FIGS. 7a-7c and 8a-8c (in which the solid line represents the results of the simulations, and the dashed line is a fit of said results), it may be noted that in the three cases analyzed the peak intensity has a maximum at values of curvature c comprised between 0.03 mm$^{-1}$ and 0.055 mm$^{-1}$. In particular, the maximum can be approximated to the value of curvature c=0.04 mm$^{-1}$.

In conclusion, it may be stated that, considering the value of aperture d in a range of 70-100 mm and the value of chord w in a range of 40-100 mm, the preferred value of curvature c is constant and equal to 0.04 mm$^{-1}$.

The lighting device 1, for example of the type illustrated in FIGS. 1a, 1b, and 3b, and described with reference to said figures, can be used individually or used as base module for making up more complex lighting systems with higher performance, for avionics applications.

Figure 9:
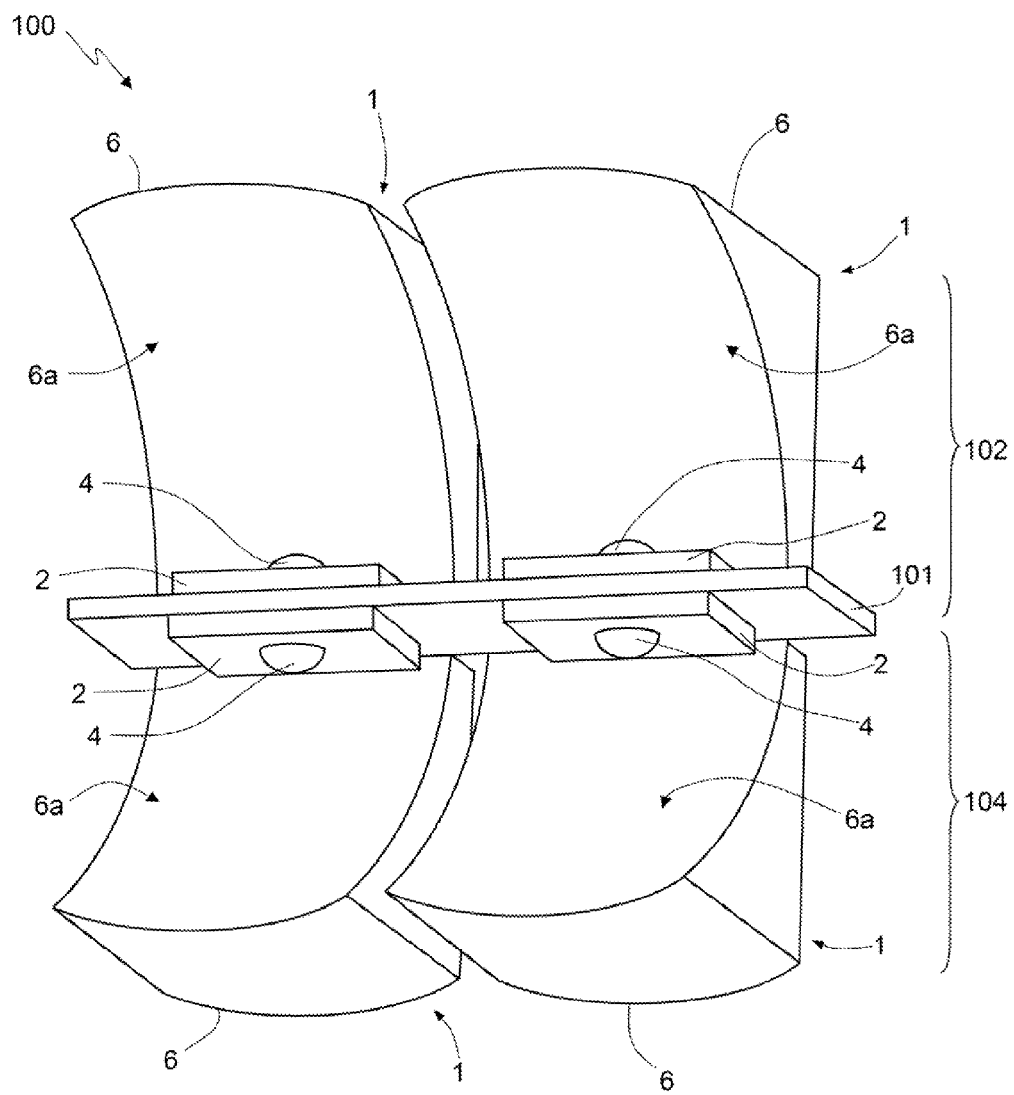
FIG. 9 shows a perspective view of a lighting system comprising a plurality of lighting devices, according to one embodiment of the present invention.

FIG. 9 shows, in perspective view, a lighting system 100, in particular configured for being used as landing light of an aircraft. The lighting system 100 comprises a first sector 102 and a second sector 104, separated by a supporting table 101. Housed in the first sector 102 are two lighting devices 1, whilst housed in the second sector 104 are another two lighting devices 1, similar to the lighting devices 1 housed in the first sector 102.

In particular, the lighting system 100 comprises lighting devices 1 provided with an LED chip having a size of 3×3 mm$^2$, hemispherical cap, and luminous flux of 1700 lumen.

The lighting devices 1 of the first and second sectors 102, 104 respectively face and are fixed, via the respective supporting boards 2, to opposite sides of the supporting table 101. All the lighting devices 1 of the lighting system 100 are oriented in the same direction so that, in use, the light radiation 10 reflected by any one of the lighting devices 1 is substantially parallel to the light radiation 10 reflected by each of the other lighting devices 1.

Said configuration enables a lighting system 100 to be obtained having a weight and dimensions that are considerably minimized.

Furthermore, since each lighting device 1 generates a reflected light radiation 10 having a peak intensity higher than 80,000 cd (both in the case of Lambertian emission and in the case of non-Lambertian emission), the lighting system 100 satisfies the requirement specified by the avionics standards MIL-L-006730 and SAE ARP 693 (which require a minimum peak intensity of 300,000 cd). These results have been obtained via optical simulation of the system of FIG. 9.

Figure 10:
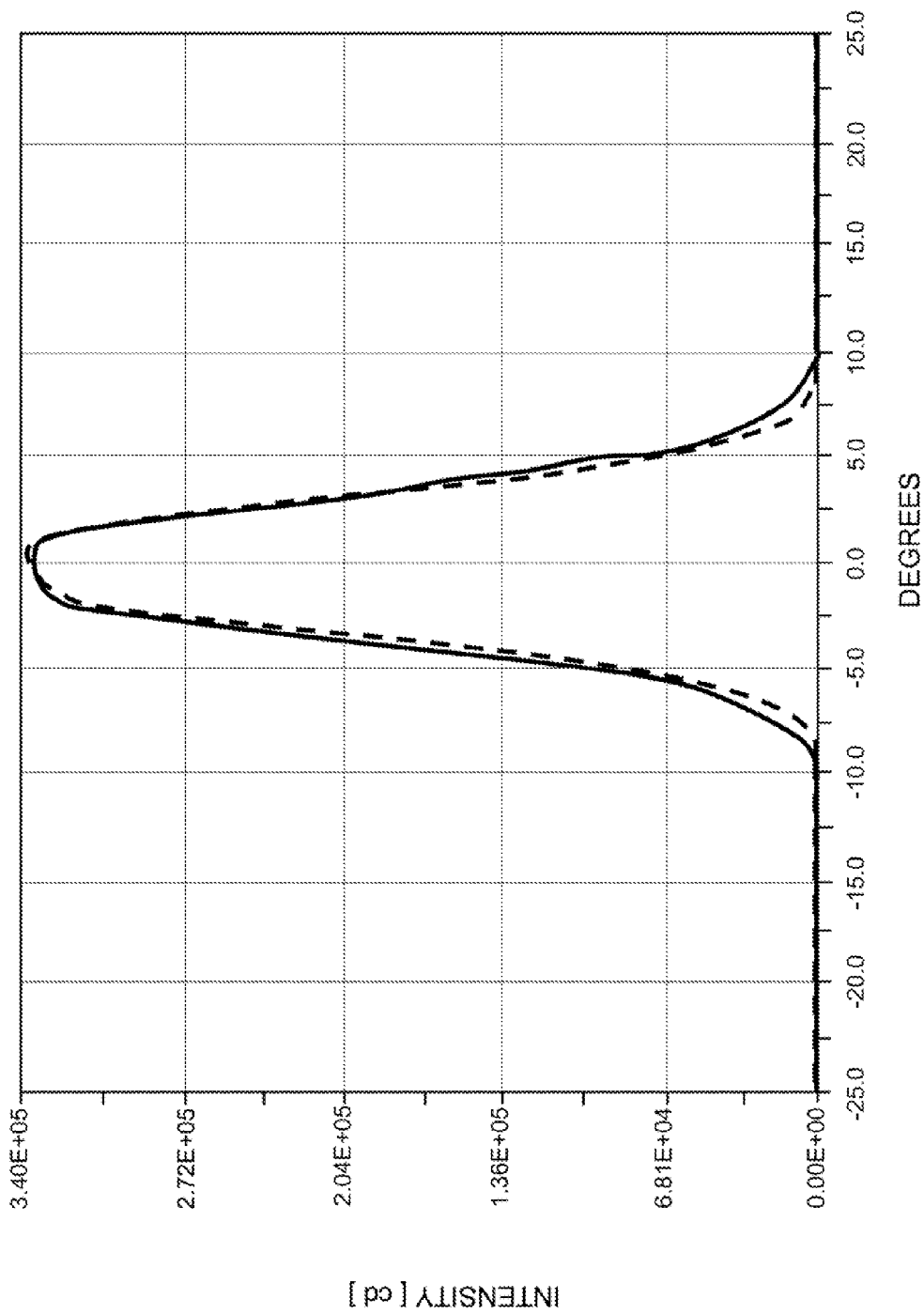
FIG. 10 shows curves of angular intensity in the planes XY and XZ obtained by optical simulations of the system of FIG. 9.

FIG. 10 shows curves of angular light intensity in the planes XY and XZ (solid curve and dashed curve, respectively). Furthermore, from FIG. 9 it emerges that the lighting system 100 satisfies also the requirements of the aforementioned avionics standards regarding the spread of the beam emitted, which should be at least 14° in the horizontal plane XY and at least 10° in the vertical plane YZ (intensity at 10% of the peak value).

Figure 11:
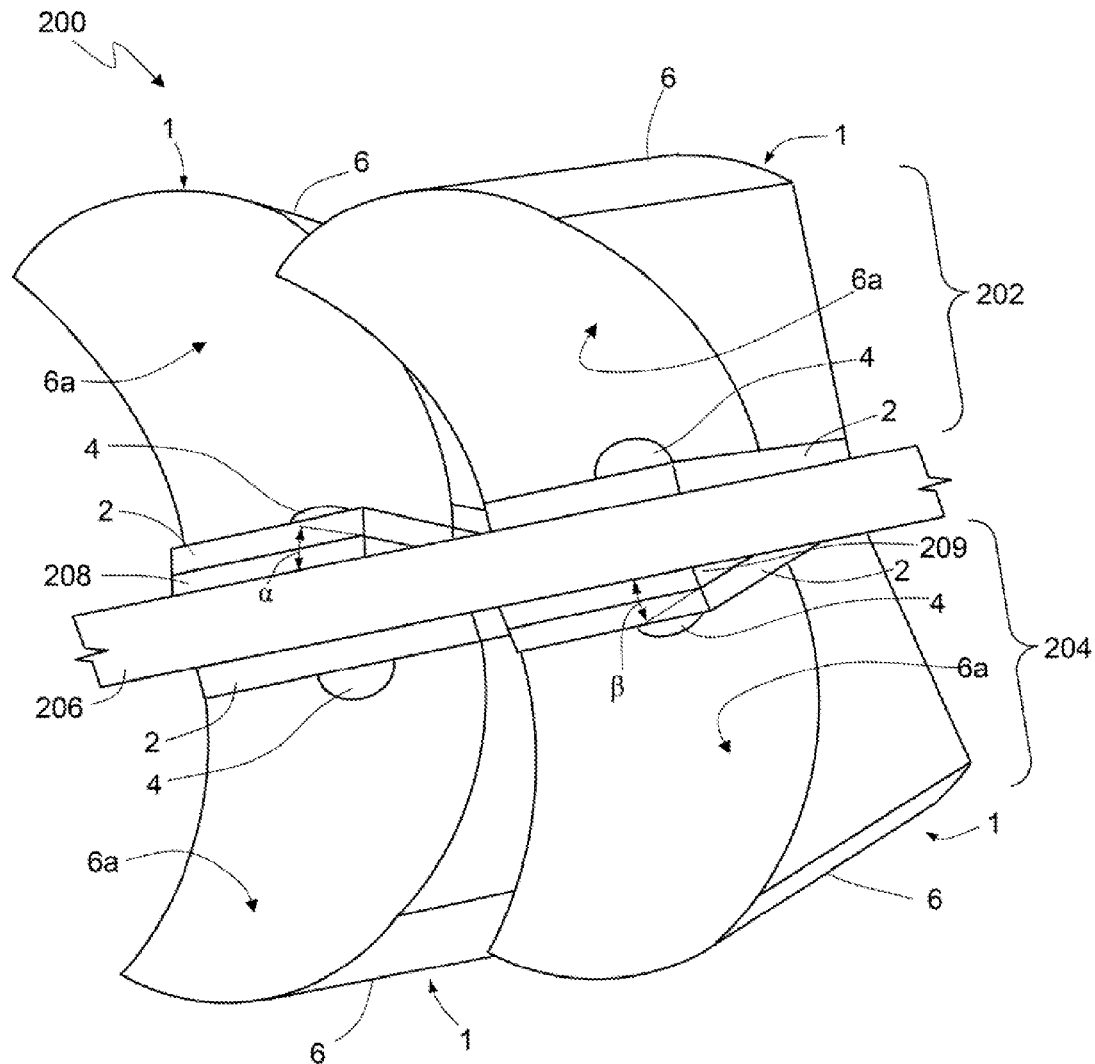
FIG. 11 shows a perspective view of a lighting system comprising a plurality of lighting devices, according to a further embodiment of the present invention.

FIG. 11 shows, in perspective view, a lighting system 200, in particular adapted to be used as taxi light of an aircraft, comprising four light-emitting modules according to the present invention, for example lighting devices 1 of the type illustrated in FIGS. 1a, 1b, and 2b, and described with reference to said figures. In a way similar to what has been described with reference to FIG. 9, also according to the embodiment of FIG. 11 the lighting devices 1 are arranged in twos in a respective first sector 202 and second sector 204 and are oriented in one and the same direction of emission. Each lighting device 1 of the lighting system of FIG. 10 is provided with a reflector 6 having an internal surface 6a shaped like a semiparabolic "slice" and defined by a parabola having a value of curvature of 0.055 mm$^{-1}$ and horizontal conic constant of 0.9. Said values have been chosen so as to obtain a reflected light radiation having a beam spread greater, in the horizontal plane XY, than the beam spread obtained via the lighting system 100 of FIG. 9. In order to limit the encumbrance of the assembled modules, in this case the aperture d of the reflector, is chosen as 70 mm. Furthermore, to extend further the beam spread of the emitted light radiation 10, the lighting devices 1 belonging to the first sector 202 are arranged alongside one another but alternately in planes inclined with respect to one another. For example, the lighting device 1 arranged on the right (looking at the figure) in the first sector 202 is arranged so that its own supporting board 2 is parallel to the horizontal plane XY, whereas the lighting device 1 arranged on the left (looking at the figure) in the first sector 202 is arranged so that its own supporting board 2 is inclined with respect to the horizontal plane XY, in particular inclined by an angle α of 16.5° in the positive direction of the axis Z. The lighting devices 1 belonging to the second sector 204 are arranged in a way similar to what is described for the lighting devices 1 belonging to the first sector 202, but in this case the lighting device 1 arranged on the left (looking at the figure) in the second sector 204 is arranged with its own supporting board 2 parallel to the horizontal plane XY, whereas the lighting device 1 arranged on the right (looking at the figure) in the second sector 204 is arranged with its own supporting board 2 inclined with respect to the horizontal plane XY by an angle β, of a value equal to the value chosen for the angle α, but in the negative direction of the axis Z.

The LEDs 4 used have the same characteristics as the LEDs used in the lighting system 100 of FIG. 9.

Said mutual arrangement of the lighting devices 1 can be, for example, implemented by providing a supporting table 206 lying in a plane parallel to the horizontal plane XY and provided with appropriate spacer elements 208 and 209, for example wedge-shaped ones, adapted to support the lighting devices 1 in a position inclined, with respect to a horizontal plane XY in which the supporting table 206 lies, by respective angles α and β.

The embodiment of the lighting system 200 of FIG. 11 enables generation of a total reflected light radiation of the lighting system 200 having a beam spread greater than the one emitted by the lighting system 100 and in particular adapted for applications of a taxi-light type.

FIG. 12 shows the angular light intensity obtained by optical simulation of the lighting system 200 (the solid curve regards the plane XY, whereas the dashed curve regards the plane XZ). From FIG. 12 it emerges that the embodiment of FIG. 11 enables a peak intensity higher than 50,000 cd and a beam spread greater than 40° in the plane XZ and greater than 10° in the plane XY to be obtained, and hence meets the requirements envisaged by avionics standards for taxi lights.

What has been previously illustrated with reference to all the embodiments described and to the corresponding simulations is based on the assumption that the LED 4 will generate a luminous flux of 1000 lumen (or more, up to some thousands of lumen). This assumption finds practical confirmation since latest-generation LEDs guarantee such a performance. However, this implies that in the area of each LED 4 or supporting board 2, 20 W or more of heat will be generated (equivalent to a power density higher than 2 W/mm$^2$). This heat must be dissipated in an effective way; if it were not so, the heat generated would remain confined in the proximity of the LED 4, and might cause a non-controlled increase of the temperature of the LED 4, with consequent failure of the LED, or degradation of its performance. Consequently, the minimum performance required by avionics standards would no longer be guaranteed, jeopardizing the degree of safety of the aircraft during use.

The applicant has found that an increase of the temperature in the area of the LED 4 (measured at the level of the package that typically houses the LEDs) comprised between approximately 100° C. and 150° C. causes a considerable decrease in the efficiency of the LED 4; above said level of temperature there is instead noted failure of the LED 4, which ceases to function.

The problem of the regulation of the temperature of the lighting device 1 is rendered even more problematical by the fact that the operation of the lighting device 1, in order to be of interest in the avionics field, must be guaranteed in all the operating conditions in which the aircraft on which the lighting device 1 is mounted might find itself, for example at ambient temperatures exceeding 50° C.

To favor heat dissipation, frequently LED lighting devices of a known type are equipped with heat dissipaters of non-negligible size and weight. These heat dissipaters cause a considerable increase in the weight of the lighting device 1, as likewise in the encumbrance thereof. Weight and encumbrance are, as is known, critical parameters for the avionics industry, and must always be reduced to a minimum. Known solutions are consequently not acceptable.

Figure 13A:
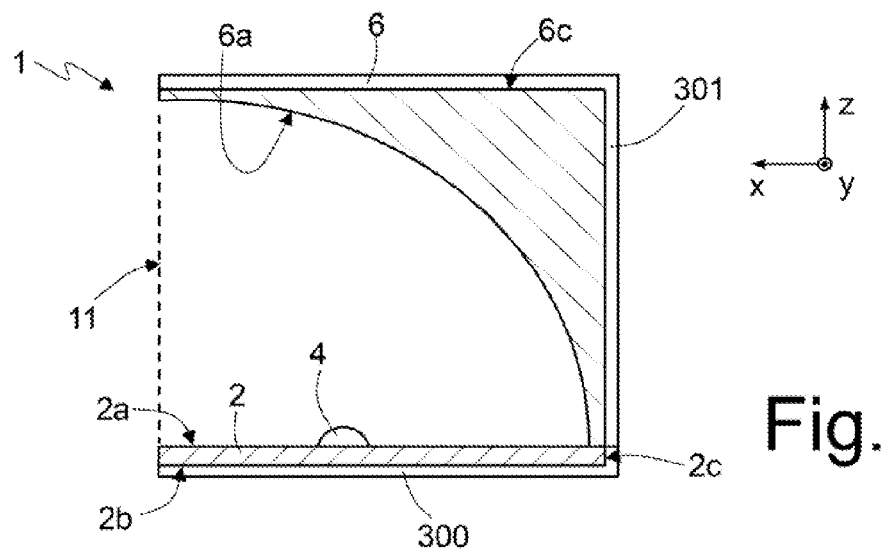
FIGS. 13a-13c show, in lateral cross-sectional view, respective embodiments of lighting devices according to the present invention, with improved efficiency of heat dissipation.

According to one embodiment of the present invention (see FIG. 13a, where elements common to those of FIG. 2b are not described any further), in order to guarantee high efficiency in dissipation of the heat generated, in use, by the LED 4, and at the time same maintain a low weight and small overall dimensions, the LED 4 is in direct thermal contact with the supporting board 2, and the latter is in turn in direct thermal contact with the reflector 6. For this purpose, the supporting board 2 comprises one or more thermally conductive paths 300 adapted to connect the supporting board 2 (in particular, the region of the latter where the LED 4 is housed) thermally to the reflector 6. Said thermally conductive paths 300 (only one of which is illustrated in FIG. 13a) are, for example, formed on a bottom surface 2b of the supporting board 2, opposite (along the axis Z) to the surface 2a where the LED 4 is arranged.

The reflector 6 comprises at least one external layer 301 made of thermally conductive material (for example, a metal having a high value of thermal conductivity, for instance, aluminum or copper), which coats the external surface 6c of the reflector 6, which is thermally coupled directly to the thermally conductive paths 300 (for example, by means of welding), without regions of interface that could degrade the thermal coupling. To favor the contact between the thermally conductive paths 300 and the external layer 301 of the reflector 6, said thermally conductive paths 300 can extend also on lateral surfaces 2c of the supporting board 2.

Possible interfaces between the thermally conductive paths 300 and the external layer 301 of the reflector 6 can be envisaged in the case where the material that forms said interfaces has a coefficient of thermal resistance lower than that of the material/materials that forms/form the thermally conductive paths 300 and the external layer 301 of the reflector 6 (for example, a conductive glue may be used).

The thermally conductive paths 300 and the external layer made of thermally conductive material of the reflector 6 are, for example, made of metal material (e.g., aluminum).

In this way, the reflector 6 acts itself as dissipater element in regard to the heat generated by the LED 4. Also the thermally conductive paths 300 act as dissipater elements in regard to the heat generated by the LED 4. According to the embodiment of FIG. 13a, the surface through which heat dissipation occurs is particularly extensive, without a significant increase in the size and weight of the lighting device 1 as compared to the case of FIG. 2b.

The embodiment illustrated in FIG. 13a, in particular with reference to the presence of the thermally conductive paths 300 and of the external layer 301 that coats the external surface 6c of the reflector 6, may be applied to any of the embodiments described previously with reference to FIGS. 1a, 1b, 3a-3d, 6a-6c.

According to a further embodiment (FIG. 13b), the bottom surface 2b of the supporting board 2 and the external surface 6c of the reflector 6 are coated by a single layer of thermally conductive material (designated by the reference number 305, for example metal material having a high value of thermal conductivity, for instance, aluminum or copper) that envelops completely the lighting device 1 on the outside (consequently, except for the internal surface 6a of the reflector 6, which, given the requirement of reflecting effectively the light radiation 8, could be made of a different material).

Figure 13B:
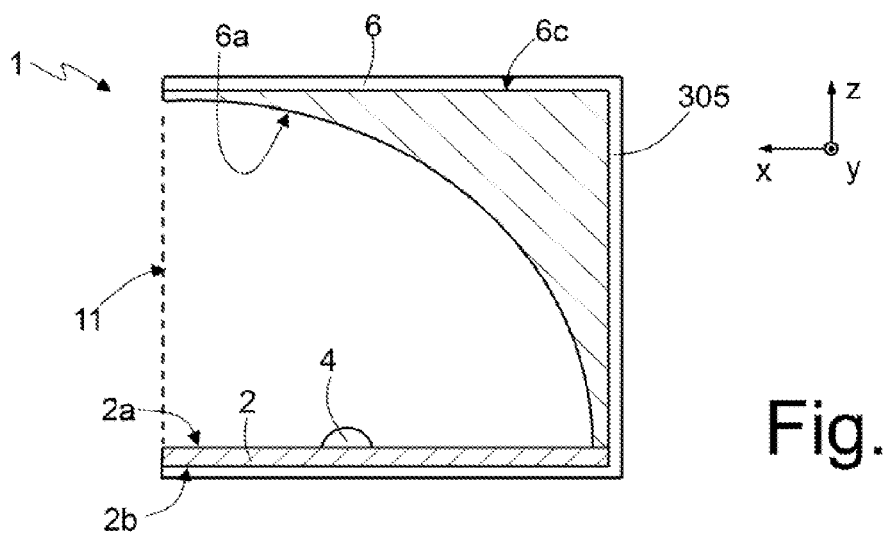

The embodiment illustrated in FIG. 13b, in particular with reference to the presence of the single layer 305 that completely coats the lighting device 1 on the outside, may be applied to any one of the embodiments described previously with reference to FIGS. 1a, 1b, 3a-3d, 6a-6c.

Figure 13C:
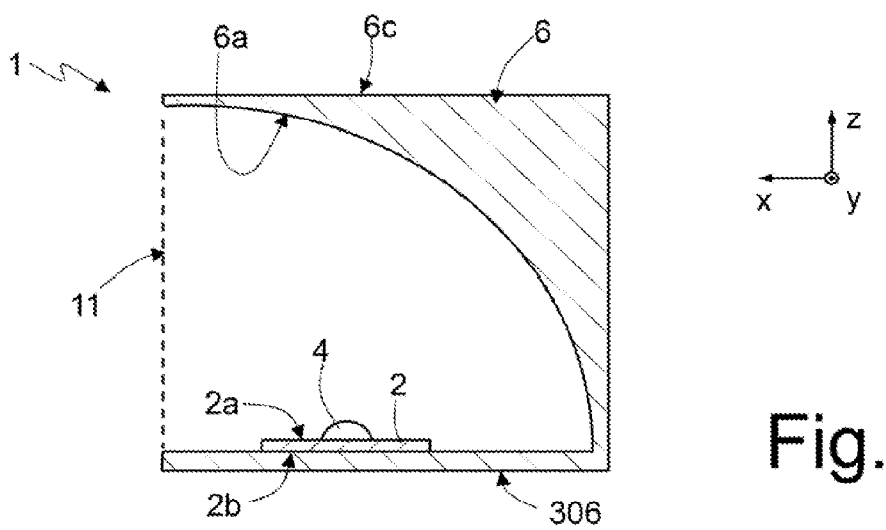

According to a further embodiment, illustrated in FIG. 13c, the lighting device 1 comprises: a reflector 6 made in a single piece of a thermally conductive material, for example a metal having a high value of thermal conductivity, such as aluminum; and a resting surface 306, which is also made in a single piece of a thermally conductive material, for example a metal having a high value of thermal conductivity, such as aluminum. The reflector 6 and the resting surface 306 are thermally coupled to one another, for example by welding. Alternatively, the reflector 6 and the resting surface 306 are formed as a single piece made of thermally conductive material, for example a metal having a high value of thermal conductivity, such as aluminum. The internal surface 6a of the reflector 6 can, in any case, be coated with a material different from the one of which the reflector 6 is made, and chosen according to the desired characteristics of reflection of the light radiation 8. The resting surface 306 has the function of supporting the supporting board 2 housing the LED 4 and functions at the same time as heat dissipater for the heat generated, in use, by the LED 4. Since the resting surface 306 and the reflector 6 are thermally coupled together (preferably, they are made as a single piece), also the reflector 6 functions as heat dissipater for the heat generated by the LED 4.

The embodiment illustrated in FIG. 13c, in which a resting surface 306 is present for housing the supporting board 2 thermally coupled directly to the reflector 6 (in particular, made as a single piece of thermally conductive material), can be applied to any of the embodiments described previously with reference to FIGS. 1a, 1b, 3a-3d, 6a-6c.

Irrespective of the embodiments of FIGS. 13a-13c, the characteristics of light emission and the characteristics regarding the shape and critical parameters of the lighting device 1 (as described previously) are unaltered.

Figure 14:
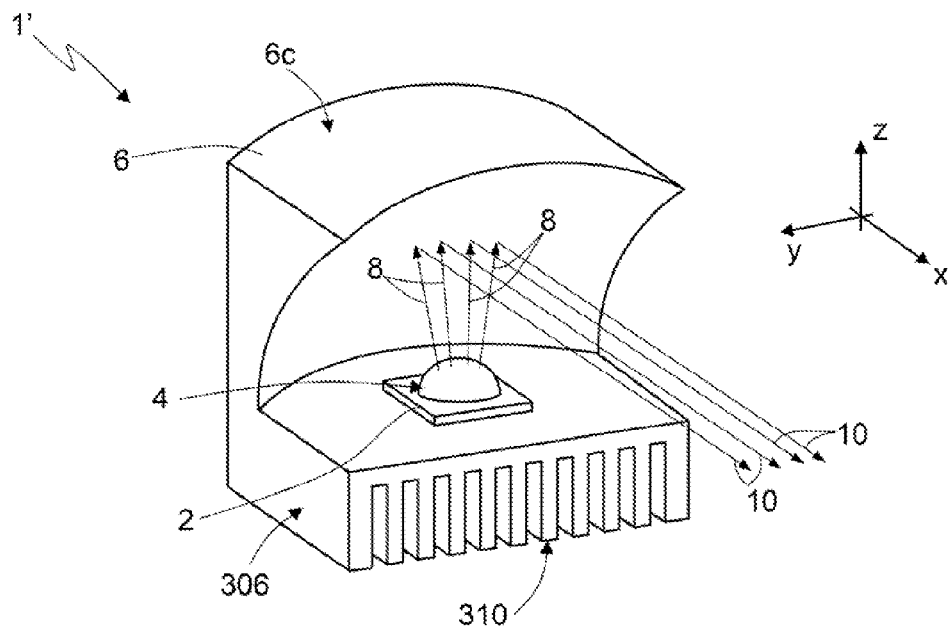
FIG. 14 shows, in perspective view, a lighting device with improved efficiency of heat dissipation, according to one embodiment of the present invention.

FIG. 14 shows, in perspective view, a lighting device 1' according to a further embodiment of the present invention.

The lighting device 1' of FIG. 14 has a structure similar to that of FIG. 13c, and comprises the resting surface 306 and the reflector 6 made in a single piece of thermally conductive material (in particular metal, for example aluminum). The supporting board 2, housing the LED 4, is arranged on the resting surface 306, in direct thermal contact with the latter (for example, coupled to the resting surface by means of a conductive glue or screws, or other fixing means). The resting surface 306 further comprises a plurality of fins 310, formed in a position corresponding to a side 306b of the resting surface 306 opposite to a side 306a of the resting surface 306 where the supporting board 2 is arranged. The fins 310 guarantee a still more efficient thermal exchange with the surrounding environment. The heat-exchange surface of the lighting device 1' of FIG. 14 is consequently represented by the surface defined by the fins 310 and by the external surface 6c of the reflector 6. It should be noted that by "external surface" is here meant the entire surface of the reflector 6 and of the resting surface 306, except possibly for the internal surface 6a of the reflector. However, in the case where also the internal surface 6a is made of thermally conductive material, also this participates in heat dispersion.

The embodiment of FIG. 14, where a resting surface 306 is present for housing the supporting board 2 made as a single piece of thermally conductive material, and where the resting surface 306 has fins 310, can be provided according to the dimensional characteristics and characteristics of performance described with reference to any one of the embodiments of FIGS. 1a, 1b, 3a-3d, 6a-6c.

It is evident that any further embodiment, obtained from any combination of the embodiments of FIGS. 1a, 1b, 3a-3d, 6a-6c, 13a-13c and 14, is possible. For example, it is possible to shape the thermally conductive path 300 of FIG. 13a so that it will present surface roughness having the function of maximizing the heat-exchange surface (for example, fins similar to the fins 310 of FIG. 14).

Figure 15:
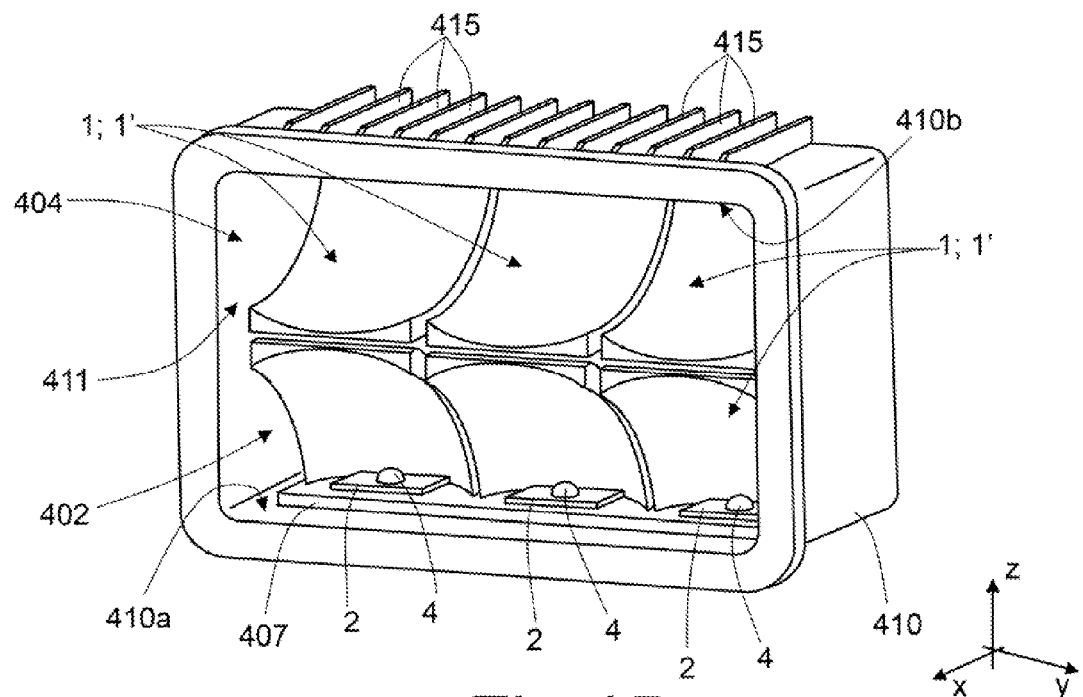
FIG. 15 shows a lighting system comprising a plurality of lighting devices of FIG. 14.

FIG. 15 shows, in perspective view according to one embodiment of the present invention, a lighting system 400 comprising a plurality of lighting devices 1' of the type illustrated in FIG. 14. It is evident that what is described with reference to FIG. 15 can be applied to lighting devices 1 according to any one of the embodiments described previously. Alternatively, the lighting devices 1, 1' of the lighting system 400 can be chosen by combining any one of the embodiments described previously with the embodiment of FIG. 14.

The lighting system 400 comprises a first sector 402 and a second sector 404. Housed in the first sector 402 are two lighting devices 1', and housed in the second sector 404 are another two lighting devices 1', similar to the lighting devices 1' housed in the first sector 402. It is evident that each sector can comprise more than two lighting devices 1' in each sector 402, 404.

In particular, the lighting system 400 comprises lighting devices 1' provided with an LED chip having a size of 3×3 mm$^2$, hemispherical cap, and luminous flux of 1700 lumen.

The lighting devices 1' of the first sector 402 are arranged facing and fixed, via the respective supporting boards 2, to a resting surface 407. The lighting devices 1' of the second sector 404 are arranged facing and fixed, via the respective supporting boards 2, to a respective resting surface (not visible in the figure), similar to the resting surface 407.

All the lighting devices 1' of the lighting system 400 are oriented in one and the same direction so that, in use, the light radiation 10 reflected by any one of the lighting devices 1' is substantially parallel to the light radiation 10 reflected by each of the other lighting devices 1'.

Other embodiments, for example of the type illustrated in FIG. 11, where the reflected light radiations 10 are not all parallel to one another are possible.

In order to dissipate in an efficient way the heat generated by the lighting devices 1' without affecting significantly the weight and size of the lighting system 400, the lighting devices 1' are housed inside a case 410 made of thermally conductive material, for example a metal having a high value of thermal conductivity, for instance aluminum. In particular, the case 410 has a quadrangular shape, defining an internal cavity defined by four walls of the case 410. The case 410 is provided with a front opening 411, and housed in the internal cavity are the lighting devices 1' and the resting surfaces 407 of the latter. Still more in particular, the resting surfaces 407 are arranged in such a way as to be in direct thermal contact with respective internal walls, diametrically opposite to one another, of the case 410.

The front opening 411 can be closed by means of a protective panel made of material transparent to the reflected light radiation 10.

Each resting surface 407 is fixed to (for example, is made of a single piece with) a plurality of reflectors 6; in this way, the lighting devices 1' that form the lighting system 400 share one and the same resting surface 407. One resting surface 407, together with the reflectors 6 fixed thereto, is thermally coupled directly to a first internal side 410a of the case 410, whereas the other resting surface 407, together with the reflectors 6 fixed thereto, is thermally coupled directly to a second internal side 410b of the case 410, opposite to the first internal side 410a along the axis Z. In this way, the reflectors 6 belonging to the first sector 402 are vertically aligned (along the axis Z) to respective reflectors 6 belonging to the second sector 404.

The case 410 further comprises heat-dissipation fins 415, arranged outside the case 410 in areas corresponding to the first and second internal sides 410a, 410b (only the fins 415 arranged in an area corresponding to the second internal side 410b are visible in the figure). In this way, for both the first sector 402 and the second sector 404, the LEDs 4, the supporting boards 2, the resting surfaces 407, the case 410, and the heat-dissipation fins 415 are all in direct thermal connection with one another, without interfaces. Possible interfaces between one or more of the elements that form the lighting system 400 mentioned above can be envisaged in the case where said interfaces are made of a material having a coefficient of thermal resistance lower than that of the material/materials that forms/form said elements of the lighting system 400.

According to one embodiment, the resting surfaces 407, the reflectors 6, the case 410, and the heat-dissipation fins 415 are made of a single piece. In this way, any formation of air pockets that might be generated in the case where the resting surfaces 407 and the reflectors 6 are coupled to the case 410 in a subsequent step is prevented. Said air pockets, in fact, would limit the heat-dissipation efficiency.

According to one embodiment (not illustrated) alternative to that of FIG. 15, the resting surfaces 407 are not present, and the supporting boards 2 are directly coupled to the respective sides 410a, 410b of the case 410.

According to a further embodiment (not illustrated), the case 410 is not present, and the resting surfaces 407, the reflectors 6, and the fins 415 are made of a single piece in the absence of the further external protection offered by the case 410.

With reference to the embodiments of FIGS. 13a-13c, 14, 15, values of thermal conductivity acceptable for the elements that form the heat dissipater of the device and of the lighting system according to the present invention (in particular, the conductive paths 300, the external layer 301, the coating layer 305, the support base 306, and the reflector 6 of FIG. 13c, the support base 306, the reflector 6, and the fins 310 of FIG. 14, the case 410, the fins 415, and the support base 407 of FIG. 15) are equal to or higher than approximately $100 \, W \cdot m^{-1} \cdot K^{-1}$, preferably higher than approximately $200 \, W \cdot m^{-1} \cdot K^{-1}$.

The possibility of providing modular lighting systems, comprising a plurality of lighting devices, enables optimization of the space occupied by said lighting systems to adapt it to each aircraft on which the lighting systems are mounted.

For example, with reference to FIG. 15, it is possible to incline the internal surface 6a of the reflector 6 of one or more lighting devices 1' with respect to the horizontal plane XY so as to obtain an inclined reflected light beam 10, in a way similar to what is illustrated in FIG. 11 and described with reference to said figure.

In certain cases, it may prove useful to section laterally the lighting device 1, 1' (along the lateral regions 6b) with planes 13 and 15 that are not mutually parallel, but inclined so as to cut out a wedge of the paraboloid of revolution instead of a section; in this way, it is possible to minimize further the volume and weight of the lighting device.

In other cases, the internal surface 6a of the reflector 6 can be obtained, instead of as section of the semiparaboloid between two parallel planes, as intersection of the semiparaboloid, for example, with a cone with a circular or elliptical base with axis coinciding with the axis 12 of the LED 4. In this way, the most energetic part of the radiation emitted by the LED 4, which is around its axis 12, is collected, and it is possible to minimize the weight and volume by reducing the useful part of the reflector. The reflected light beam 10 that is obtained in this case presents sharper outlines, since the reflecting surface is cut out around the axis 12 of the LED 4.

Figure 16:
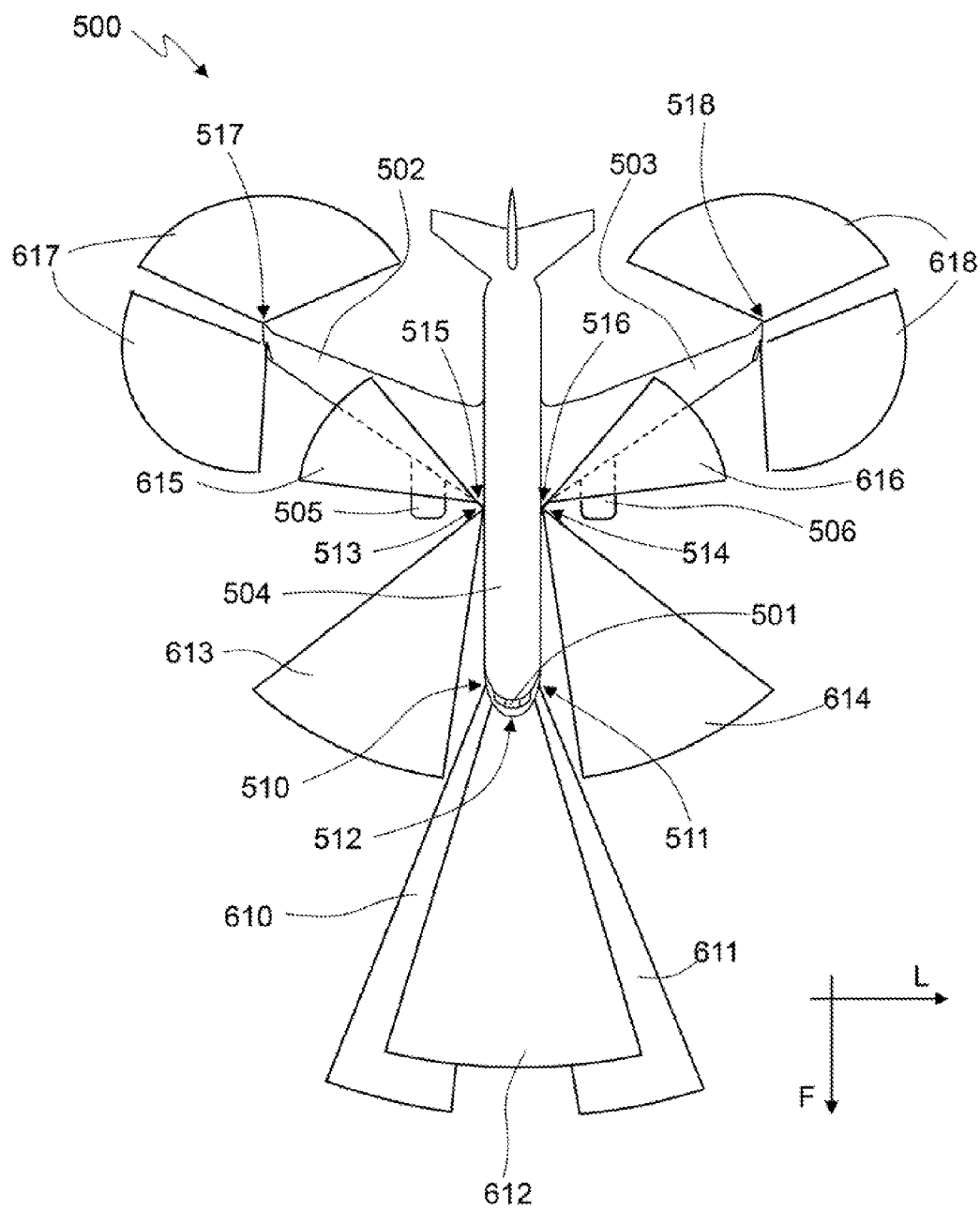
FIG. 16 shows an aircraft comprising a plurality of lighting devices, and/or lighting systems according to any one of the embodiments of FIGS. 1a, 3a-3d, 6a-6c, 9, 11, 13a-13c, 14, 15.

FIG. 16 shows in top view, an aircraft 500, in particular an aircraft for civil use, provided with a plurality of lighting systems 510-518. Alternative embodiments (not illustrated in the figure) can envisage the use of a single lighting system.

Each of the lighting systems 510-518 is chosen from among the lighting systems 100, 200, and 400 described with reference to FIGS. 9, 11, and 15, respectively. The best performance is obtained, as discussed previously, in the case of use of the lighting system 400, which guarantees maximum heat dissipation maintaining low weight and small overall dimensions.

It is evident that, according to further embodiments of the present invention, one or more of the lighting systems 510-518 of the aircraft 500 can comprise a single lighting device 1, 1' according to the present invention (in particular, one of the light-emitting modules of FIGS. 3a-3d, 6a-6c, 13a-13c, 14).

In addition, according to further embodiments of the present invention, one or more of the lighting systems 510-518 of the aircraft 500 can comprise a plurality of lighting devices 1, 1' arranged alongside one another according to configurations different from the ones illustrated in FIGS. 9, 11, and 15.

The aircraft 500 comprises, according to the embodiment of FIG. 15, a first lighting system 510 and a second lighting system 511 arranged in the proximity of the nose 501 of the aircraft 500. The first and second lighting systems 510, 511 generate, in use, a respective light beam 610, 611 in an at least partially frontal direction (axis F of FIG. 15), and have the function of landing lights. The aircraft 500 further comprises a third lighting system 512, which is also arranged in the proximity of the nose 501 of the aircraft 500, for example in an intermediate position between the first and second lighting systems 510, 511. The third lighting system 512 generates a light beam 612 in a frontal direction, and has the function of taxi light or search light.

The aircraft 500 further comprises a fourth lighting system 513 and a fifth lighting system 514, arranged on the aircraft 500 in the proximity of the areas of union between the wings 552, 553 of the aircraft 500 and the fuselage 504. The fourth and fifth lighting systems 513, 514 are adapted to generate a respective light beam 613, 614 in a frontal and partially lateral direction of the aircraft 500, and have the function of taxi lights.

The aircraft 500 further comprises a sixth lighting system 515 and a seventh lighting system 516, which are arranged in the proximity of the fourth and fifth lighting systems 513, 514 and are adapted to generate a respective light beam 615, 616 in a direction of the engines 505, 506 of the aircraft 500, for lighting thereof.

Finally, the aircraft 500 comprises further lighting systems (designated as a whole by the reference numbers 517 and 518) arranged in the proximity of external end portions of the wings 502, 503. Said lighting systems 517, 518 are adapted to generate respective light beams 617, 618 having signaling functions, for example for other aircraft, for the control tower, etc.

From an examination of the characteristics of the disclosure provided according to the present invention the advantages that it affords are evident.

In particular, the embodiments of FIGS. 13c, 14, and 15 enable reduction of the overall thermal resistance of the respective lighting devices 1, 1' and lighting system 400 in so far as the interfaces for connection between the various elements are minimized. The heat dissipation is considerably improved, guaranteeing a longer service life for the lighting device 1, 1'.

The possibility of envisaging a modular composition, in the design stage, of the lighting system 100, 200, 400 affords numerous advantages. In particular, the performance can be adapted according to the need. When a high intensity is required, it is sufficient to combine together as many light-emitting modules as are necessary to achieve said light intensity so as to form a lighting system according to the present invention.

In the production step, when the resulting structure of the lighting device 11 (FIG. 14) or of the lighting system 400 (FIG. 15) is obtained as a single piece, the effectiveness of the dissipation is considerably increased.

Furthermore, the same light-emitting modules can be used to produce indifferently landing lights, taxi lights, and search lights or other types of lights, provided that they are arranged in an appropriate way with respect to one another (as described previously, for example, with reference to FIGS. 9, 11, 15).

Finally, it is clear that modifications and variations may be made to what is described and illustrated herein, without thereby departing from the sphere of protection of the present invention, as defined in the annexed claims.

For example the LED sources used can be of a side-emitting type. In this case, for each lighting device 1, 1', the reflector 6 (also in this case provided as one or more "slices" of semiparabola) is arranged only alongside each LED, in such a way as to collect the light radiation emitted in a direction parallel to the horizontal plane XY (i.e., substantially perpendicular to the LED) and generate an emitted light radiation 10 which is also parallel to the horizontal plane XY but orthogonal to the light radiation collected by the reflector 6. This embodiment enables optimization of the occupation of space in the vertical direction (along the axis Z).

As an alternative to the embodiment of FIG. 11, a lighting system for applications of a taxi-light type can be provided starting from the embodiment of the lighting system 100 of FIG. 9 by providing each lighting device 1, 1' with a lens (not illustrated) arranged parallel to the plane of emission 11 and configured to act as refractive optical element to model the light radiation 10 reflected by each lighting device 1, 1' in such a way that the emitted light radiation 10 will have the beam spread in the horizontal plane XY required for use as taxi light. Similar considerations apply also with reference to the embodiment of the lighting system 400 of FIG. 15.

A lighting system for applications of a search-light type can be provided in a way similar to what is described for the lighting system 100 of FIG. 9 or for the lighting system 400 of FIG. 15 (thus obtaining a search light with high intensity and reduced angular aperture), or else, in the case where a light beam with different characteristics is required, it is possible to act on the shape of the reflector so as to vary the peak light intensity, the direction of the maximum intensity, and the angular spread of the light beam.

Furthermore, the embodiments of the lighting system described and illustrated are not limited to the use as landing, taxi, or search lights but can be used as lights for wing scan, engine scan, etc.

Furthermore, the disclosure according to the present invention can be used also for infrared covert illumination. In this case, the LED 4 is configured for emitting infrared radiation (for example, with a wavelength in the range 780-930 nm), preferably at high power, for example a light radiation having optical power of 3.6 W. The peak intensity and the angular aperture can vary considerably according to the specific application.

Furthermore, the internal surface 6a of the reflector 6 can be of a faceted type.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A light-emitting device for an aircraft, comprising:
a light-emitting semiconductor device configured to emit a light radiation;
a substrate, having a first side and a second side opposite to one another, housing the light-emitting semiconductor device at the first side;
a curved reflector having a concave reflecting surface and defining a plane of emission, the concave reflecting surface including a semiparabolic shape, facing the light-emitting semiconductor device to collect the light radiation and generating a radiation reflected through the plane of emission, and the substrate and the curved reflector being in thermal contact with one another, the curved reflector including a body including thermally conductive material and forming a first portion of a heat dissipater of said light-emitting device wherein the light radiation has a value of luminous flux higher than 1500 lumen.

2. The device according to claim 1, further comprising a support base configured to carry said substrate, the support base including a thermally conductive material, the substrate, the support base, and the body of the curved reflector being in direct thermal contact with one another, the support base forming a second portion of the heat dissipater.

3. The device according to claim 2, wherein the support base and the curved reflector are a single piece and form said heat dissipater.

4. The device according to claim 1, further comprising a plurality of thermally conductive fins extending from the support base and in thermal contact with the support base.

5. A light-emitting device for an aircraft, comprising:
a light-emitting semiconductor device;
a substrate, having a first side and a second side opposite one another, the substrate housing the light-emitting semiconductor device at the first side and including one or more metal paths formed at the second side of the substrate; and
a curved reflector having a concave reflecting surface and defining a plane of emission, the concave reflecting surface including a semiparabolic shape, and being arranged facing the light-emitting semiconductor device to collect light and generate radiation reflected through the plane of emission, and the substrate and the curved reflector being in thermal contact with one another, the curved reflector including a body including a first thermally conductive material and forming a first portion of a heat dissipater of the light-emitting semiconductor device and a second thermally conductive region includes a metal coating layer adapted to coat the curved reflector.

6. The device according to claim 1, wherein the concave reflecting surface includes a plurality of facets.

7. The device according to claim 1, wherein the light radiation is a Lambertian emission.

8. The device according to claim 1, wherein the light radiation is collimated.

9. The device according to claim 1, wherein the concave reflecting surface has a value of curvature of approximately 0.04 mm$^{-1}$, a value of chord of approximately 40 mm, and a value of aperture equal to approximately 100 mm.

10. A light-emitting device for an aircraft, comprising:
a light-emitting semiconductor device having an emitting area of between 1 mm$^2$ and 9 mm$^2$;
a substrate, having a first side and a second side opposite to one another, housing the light-emitting semiconductor device at the first side;
a curved reflector having a concave reflecting surface and defining a plane of emission, the concave reflecting surface including a semiparabolic shape, and being arranged facing the light-emitting semiconductor device to collect the light radiation and generate a radiation reflected through the plane of emission, and the substrate and the curved reflector being in thermal contact with one another, the curved reflector including a body including thermally conductive material and forming a first portion of a heat dissipater of said light-emitting device.

11. The device according to claim 1, wherein the light-emitting semiconductor device is a side-emitter configured to emit a light radiation substantially in a direction parallel to the horizontal plane, said concave reflecting surface facing the light-emitting semiconductor device to collect the light radiation.

12. The device according to claim 1, wherein the light-emitting semiconductor device is configured to emit a light radiation in a plane having an angle of inclination with respect to the horizontal plane.

13. The device according to claim 1, wherein the light-emitting semiconductor device emits a light radiation in the range of the infrared.

14. The device according to claim 1, wherein said semiparabolic shape of the concave reflecting surface is obtained by sectioning a semiparaboloid along two mutually parallel cutting planes, or by sectioning a semiparaboloid along two cutting planes having a point of intersection, or intersecting a semiparaboloid with a cone with a circular or elliptical base having an axis aligned with a principal axis of emission of the light radiation.

15. A lighting system for an aircraft comprising an array of light-emitting devices according to claim 1.

16. The system according to claim 15, wherein said light-emitting devices of said array are housed on a mechanical support including a thermally conductive material and are in direct thermal contact with said mechanical support, the mechanical support being part of said heat dissipater of said light-emitting devices.

17. The system according to claim 16, wherein the curved reflectors of said light-emitting devices and the mechanical support are a single unitary piece.

18. The system according to claim 16, wherein said mechanical support includes fins to favor heat dissipation.

19. The system according to claim 16, said array comprising at least one first light-emitting device and one second light-emitting device formed alongside one another along two respective cutting planes and having the respective supporting substrate lying in one and the same first horizontal plane.

20. The system according to claim 19, said array further comprising
a third light-emitting device and a fourth light-emitting device arranged alongside one another in two respective cutting planes and having the respective supporting substrate lying in one and the same second horizontal plane parallel to the first horizontal plane,
the mechanical support having a substantially quadrangular shape provided with an internal housing defined by a first internal wall, a second internal wall, a third internal wall, and a fourth internal wall,
said first and second light-emitting device being arranged inside the mechanical support in a position corresponding to the first internal wall, and said third and fourth light-emitting devices being arranged inside the mechanical support in a position corresponding to the second internal wall diametrically opposite to the first internal wall.

21. The system according to claim 20, wherein one of said first light-emitting device and said second light-emitting device and/or one of said third light-emitting device and said fourth light-emitting device are inclined in opposite directions with respect to the first and second horizontal planes.

22. The system according to claim 16, wherein the mechanical support includes a window transparent to the reflected radiation.

23. An aircraft comprising at least one lighting system according to claim 15, said lighting system forming a landing light, and/or a taxi light, and/or a search light.

* * * * *